United States Patent
Czaplicki

(10) Patent No.: US 6,668,457 B1
(45) Date of Patent: *Dec. 30, 2003

(54) HEAT-ACTIVATED STRUCTURAL FOAM REINFORCED HYDROFORM

(75) Inventor: Michael J. Czaplicki, Rochester, MI (US)

(73) Assignee: L&L Products, Inc., Romeo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/459,756

(22) Filed: Dec. 10, 1999

(51) Int. Cl.$^7$ .................................................. B23P 6/00
(52) U.S. Cl. .................. 29/897.1; 29/897.2; 29/402.09; 29/402.18; 29/421.1; 29/447; 29/469.5
(58) Field of Search .......................... 428/308.4, 36.9, 428/317.1, 319.1; 29/897.1, 897, 897.2, 897.35, 402.09, 402.18, 421.1, 447, 469.5, 530, 890.031; 264/46.9, 46.5, 46.7; 296/188, 146.6, 205; 138/146, 112, 153; 52/731.6, 735.1, 309.9; 403/220, 225, 228

(56) References Cited

U.S. PATENT DOCUMENTS

| | | | |
|---|---|---|---|
| 1,814,677 A | 7/1931 | Fennema | |
| 3,054,636 A | 9/1962 | Wessells, III | |

(List continued on next page.)

FOREIGN PATENT DOCUMENTS

| | | |
|---|---|---|
| AT | 0 236 291 | 9/1987 |
| DE | 2919046 | 5/1979 |
| DE | 3627725 A1 | 2/1988 |
| DE | 40 28 895 C1 | 2/1992 |
| DE | 9320333.0 | 6/1994 |
| DE | 19635734 A1 | 4/1997 |
| DE | 196 44 047 A1 | 5/1998 |
| DE | 196 48 164 A1 | 5/1998 |
| DE | 198 12 288 C1 | 5/1999 |
| DE | 19753658 A1 | 6/1999 |
| DE | 29904705 U1 | 6/1999 |
| DE | 198 56 255 C1 | 1/2000 |
| DE | 198 58 903 A1 | 6/2000 |
| EP | 0679501 A1 | 11/1995 |
| EP | 0 891 918 A1 | 1/1999 |

(List continued on next page.)

OTHER PUBLICATIONS

Copending U.S. application Ser. No. 09/584,211 filed May 31, 2000.
Copending U.S. application Ser. No. 09/655,965 filed Sep. 6, 2000.
Copending U.S. application Ser. No. 09/858,939 filed May 16, 2001.

(List continued on next page.)

*Primary Examiner*—Charles T. Jordan
*Assistant Examiner*—T. Nguyen
(74) *Attorney, Agent, or Firm*—Dobrusin & Thennisch PC

(57) ABSTRACT

A reinforced hydroform member having an outer structural member reinforced by a structural foam supported by the outer structural member. The structural foam extends along at least a portion of the length of the outer structural member. The structural foam is a heat-activated epoxy-based resin. As the foam is heated, it expands and adheres to adjacent surfaces. The preferred structural foam material is commercially available from L&L Products of Romeo, Michigan under the designation L5206, L5207, L5208, or L5209.

31 Claims, 2 Drawing Sheets

U.S. PATENT DOCUMENTS

| | | |
|---|---|---|
| 3,123,170 A | 3/1964 | Bryant |
| 3,493,257 A | 2/1970 | Fitzgerald et al. |
| 3,649,375 A | 3/1972 | Venkatesan |
| 3,665,968 A | 5/1972 | DePutter |
| 3,746,387 A | 7/1973 | Schwenk |
| 3,757,559 A | 9/1973 | Welsh |
| 3,868,796 A | 3/1975 | Bush |
| 3,890,108 A | 6/1975 | Welsh |
| 4,019,301 A | 4/1977 | Fox |
| 4,029,128 A | 6/1977 | Yamagishi |
| 4,082,825 A | 4/1978 | Puterbaugh |
| 4,083,384 A | 4/1978 | Horne et al. |
| 4,090,734 A | 5/1978 | Inami et al. |
| 4,238,540 A | 12/1980 | Yates et al. |
| 4,378,395 A | 3/1983 | Asoshina et al. |
| 4,397,490 A | 8/1983 | Evans et al. |
| 4,440,434 A | 4/1984 | Celli |
| 4,457,555 A | 7/1984 | Draper |
| 4,463,870 A | 8/1984 | Coburn, Jr. et al. |
| 4,559,274 A | 12/1985 | Kloppe et al. |
| 4,610,836 A | 9/1986 | Wycech |
| 4,613,177 A | 9/1986 | Loren et al. |
| 4,695,343 A | 9/1987 | Wycech |
| 4,705,716 A | 11/1987 | Tang |
| 4,732,806 A | 3/1988 | Wycech |
| 4,751,249 A | 6/1988 | Wycech |
| 4,762,352 A | 8/1988 | Enomoto |
| 4,769,391 A | 9/1988 | Wycech |
| 4,803,108 A | 2/1989 | Leuchten et al. |
| 4,813,690 A | 3/1989 | Coburn, Jr. |
| 4,836,516 A | 6/1989 | Wycech |
| 4,853,270 A | 8/1989 | Wycech |
| 4,861,097 A | 8/1989 | Wycech |
| 4,898,630 A | 2/1990 | Kitoh et al. |
| 4,901,395 A | 2/1990 | Semrau |
| 4,901,500 A | 2/1990 | Wycech |
| 4,908,930 A | 3/1990 | Wycech |
| 4,917,435 A | 4/1990 | Bonnett et al. |
| 4,922,596 A | 5/1990 | Wycech |
| 4,923,902 A | 5/1990 | Wycech |
| 4,946,737 A | 8/1990 | Lindeman et al. |
| 4,978,562 A | 12/1990 | Wycech |
| 4,984,406 A | 1/1991 | Friesen |
| 4,989,913 A | 2/1991 | Moore, III |
| 4,995,545 A | 2/1991 | Wycech |
| 5,040,803 A | 8/1991 | Cieslik et al. |
| 5,072,952 A | 12/1991 | Irrgeher et al. |
| 5,102,188 A | 4/1992 | Yamane |
| 5,122,398 A | 6/1992 | Seiler et al. |
| 5,124,186 A | 6/1992 | Wycech |
| 5,194,199 A | 3/1993 | Thum |
| 5,213,391 A | 5/1993 | Takagi |
| 5,255,487 A | 10/1993 | Wieting et al. |
| 5,266,133 A | 11/1993 | Hanley et al. |
| 5,344,208 A | 9/1994 | Bien et al. |
| 5,358,397 A | 10/1994 | Ligon et al. |
| 5,373,027 A | 12/1994 | Hanley et al. |
| 5,382,397 A | 1/1995 | Turner, Jr. |
| 5,395,135 A | 3/1995 | Lim et al. |
| 5,474,721 A * | 12/1995 | Stevens ............... 264/45.3 |
| 5,475,911 A * | 12/1995 | Wells et al. ............... 29/33 |
| 5,506,025 A | 4/1996 | Otto et al. |
| 5,560,672 A | 10/1996 | Lim et al. |
| 5,575,526 A * | 11/1996 | Wycech ............... 296/205 |
| 5,577,784 A | 11/1996 | Nelson |
| 5,580,120 A | 12/1996 | Nees et al. |
| 5,642,914 A | 7/1997 | Takabatake |
| 5,648,401 A | 7/1997 | Czaplicki et al. |
| 5,649,400 A | 7/1997 | Miwa |
| 5,652,039 A | 7/1997 | Tremain et al. |
| 5,660,116 A | 8/1997 | Dannawi et al. |
| 5,707,098 A | 1/1998 | Uchida et al. |
| 5,725,272 A | 3/1998 | Jones |
| 5,731,069 A | 3/1998 | Delle Donne et al. |
| 5,755,486 A | 5/1998 | Wycech |
| 5,766,719 A | 6/1998 | Rimkus |
| 5,785,376 A | 7/1998 | Nees et al. |
| 5,786,394 A | 7/1998 | Slaven |
| 5,803,533 A | 9/1998 | Schulz et al. |
| 5,804,608 A | 9/1998 | Nakazato et al. |
| 5,806,915 A | 9/1998 | Takabatake |
| 5,806,919 A | 9/1998 | Davies |
| 5,819,408 A | 10/1998 | Catlin |
| 5,851,626 A | 12/1998 | McCorry et al. |
| 5,855,094 A | 1/1999 | Baudisch et al. |
| 5,866,052 A | 2/1999 | Muramatsu |
| 5,871,849 A | 2/1999 | Lepine |
| 5,878,784 A | 3/1999 | Sales et al. |
| 5,884,960 A * | 3/1999 | Wycech |
| 5,885,494 A * | 3/1999 | Venkataraman et al. ... 264/46.5 |
| 5,885,688 A | 3/1999 | McLaughlin |
| 5,888,600 A | 3/1999 | Wycech |
| 5,888,642 A | 3/1999 | Meteer et al. |
| 5,894,071 A | 4/1999 | Merz et al. |
| 5,901,528 A | 5/1999 | Richardson |
| 5,901,752 A | 5/1999 | Lundman |
| 5,902,656 A * | 5/1999 | Hwang ............... 428/36.91 |
| 5,904,024 A | 5/1999 | Miwa |
| 5,931,474 A | 8/1999 | Chang et al. |
| 5,932,680 A | 8/1999 | Heider |
| 5,934,737 A | 8/1999 | Abouzahr |
| 5,941,597 A | 8/1999 | Horiuchi et al. |
| 5,984,389 A | 11/1999 | Nuber |
| 5,985,435 A | 11/1999 | Czaplicki et al. |
| 5,988,734 A | 11/1999 | Longo et al. |
| 5,992,923 A | 11/1999 | Wycech |
| 5,994,422 A | 11/1999 | Born et al. |
| 6,003,274 A | 12/1999 | Wycech |
| 6,004,425 A | 12/1999 | Born et al. |
| 6,006,484 A | 12/1999 | Geissbuhler |
| 6,022,066 A | 2/2000 | Tremblay et al. |
| 6,033,300 A | 3/2000 | Schneider |
| 6,050,630 A | 4/2000 | Hochet |
| 6,053,210 A | 4/2000 | Chapman et al. |
| 6,058,673 A | 5/2000 | Wycech |
| 6,059,342 A | 5/2000 | Kawai et al. |
| 6,068,424 A | 5/2000 | Wycech |
| 6,073,991 A | 6/2000 | Naert |
| 6,077,884 A | 6/2000 | Hess et al. |
| 6,079,180 A | 6/2000 | Wycech |
| 6,082,811 A | 7/2000 | Yoshida |
| 6,090,232 A | 7/2000 | Seeliger et al. |
| 6,092,864 A | 7/2000 | Wycech et al. |
| 6,094,798 A | 8/2000 | Seeliger et al. |
| 6,096,403 A | 8/2000 | Wycech et al. |
| 6,096,791 A | 8/2000 | Born et al. |
| 6,099,948 A | 8/2000 | Paver, Jr. |
| 6,102,379 A | 8/2000 | Ponslet et al. |
| 6,102,473 A | 8/2000 | Steininger et al. |
| 6,103,341 A | 8/2000 | Barz et al. |
| 6,103,784 A | 8/2000 | Hilborn et al. |
| 6,110,982 A | 8/2000 | Russick et al. |
| 6,129,410 A | 10/2000 | Kosaraju et al. |
| 6,131,897 A | 10/2000 | Barz et al. |
| 6,135,542 A | 10/2000 | Emmelmann et al. |
| 6,146,565 A | 11/2000 | Keller |
| 6,149,227 A | 11/2000 | Wycech |
| 6,150,428 A | 11/2000 | Hanley, IV et al. |
| 6,152,260 A | 11/2000 | Eipper et al. |
| 6,153,709 A | 11/2000 | Xiao et al. |
| 6,165,588 A | 12/2000 | Wycech |

| | | | | | | |
|---|---|---|---|---|---|---|
| 6,168,226 | B1 | 1/2001 | Wycech | JP | 5-38992 | 2/1993 |
| 6,174,932 | B1 | 1/2001 | Pachl et al. | JP | 0 775 721 A1 E PX | 5/1997 |
| 6,183,013 | B1 | 2/2001 | Mackenzie et al. | JP | 2001191947 | 7/2001 |
| 6,189,953 | B1 | 2/2001 | Wycech | JP | 02001191949 A | 7/2001 |
| 6,196,621 | B1 | 3/2001 | VanAssche et al. | WO | WO 87/01978 | 4/1987 |
| 6,197,403 | B1 | 3/2001 | Brown et al. | WO | PCT/JP88/00029 | 7/1989 |
| 6,199,940 | B1 | 3/2001 | Hopton et al. | WO | WO 89/06595 | 7/1989 |
| 6,216,509 | B1 | 4/2001 | Lotspaih et al. | WO | WO 95/32110 | 5/1995 |
| 6,232,433 | B1 | 5/2001 | Narayan | WO | PCT/US97/10693 | 6/1997 |
| 6,233,826 | B1 * | 5/2001 | Wycech | WO | PCT/US97/07644 | 11/1997 |
| 6,237,304 | B1 | 5/2001 | Wycech | WO | PCT/US97/19981 | 11/1997 |
| 6,247,287 | B1 | 6/2001 | Takabatake | WO | WO 98/36944 | 8/1998 |
| 6,253,524 | B1 | 7/2001 | Hopton et al. | WO | PCT/US98/08980 | 11/1998 |
| 6,254,488 | B1 * | 7/2001 | Hill .................. 464/180 | WO | PCT/US98/16461 | 2/1999 |
| 6,263,635 | B1 | 7/2001 | Czaplicki | WO | WO 99/20516 | 4/1999 |
| 6,270,600 | B1 | 8/2001 | Wycech | WO | WO 99/28575 | 6/1999 |
| 6,272,809 | B1 | 8/2001 | Wycech | WO | WO 99/48746 | 9/1999 |
| 6,276,105 | B1 | 8/2001 | Wycech | WO | WO 00/03894 | 1/2000 |
| 6,277,898 | B1 | 8/2001 | Pachl et al. | WO | WO 00/12595 | 4/2000 |
| 6,281,260 | B1 | 8/2001 | Hanley, IV et al. | WO | WO 00/27920 | 5/2000 |
| 6,287,666 | B1 | 9/2001 | Wycech | WO | WO 00/37302 | 6/2000 |
| 6,296,298 | B1 | 10/2001 | Barz | WO | WO 00/43254 | 7/2000 |
| 6,303,672 | B1 | 10/2001 | Papalos et al. | WO | WO 00/55444 | 9/2000 |
| 6,305,136 | B1 | 10/2001 | Hopton et al. | WO | WO 01/54936 | 8/2001 |
| 6,311,452 | B1 | 11/2001 | Barz et al. | WO | WO 01/56845 | 8/2001 |
| 6,315,938 | B1 | 11/2001 | Jandali | WO | WO 01/57130 | 8/2001 |
| 6,319,964 | B1 | 11/2001 | Blank et al. | WO | WO 01/71225 | 9/2001 |
| 6,321,793 | B1 | 11/2001 | Czaplicki et al. | WO | WO 01/83206 | 11/2001 |
| 6,332,731 | B1 | 12/2001 | Wycech | | | |
| 6,341,467 | B1 | 1/2002 | Wycech | | | |
| 6,348,513 | B1 | 2/2002 | Hilborn et al. | | | |
| 6,368,438 | B1 | 4/2002 | Chang et al. | | | |
| 6,372,334 | B1 | 4/2002 | Wycech | | | |
| D457,120 | S | 5/2002 | Broccardo et al. | | | |
| 6,382,635 | B1 | 5/2002 | Fitzgerald | | | |
| 6,389,775 | B1 | 5/2002 | Steiner et al. | | | |
| 6,406,078 | B1 | 6/2002 | Wycech | | | |
| 6,413,611 | B1 | 7/2002 | Roberts et al. | | | |
| 6,467,834 | B1 * | 10/2002 | Barz et al. ............... 296/187 | | | |
| 6,471,285 | B1 * | 10/2002 | Czaplicki et al. ......... 296/188 | | | |
| 6,482,486 | B1 * | 11/2002 | Czaplicki et al. ....... 428/36.91 | | | |
| 6,486,256 | B1 | 11/2002 | Tarbutton et al. | | | |
| 2002/0053179 | A1 | 5/2002 | Wycech | | | |
| 2002/0054988 | A1 | 5/2002 | Wycech | | | |
| 2002/0074827 | A1 | 6/2002 | Fitzgerald et al. | | | |

FOREIGN PATENT DOCUMENTS

| | | |
|---|---|---|
| EP | 0 893 331 A1 | 1/1999 |
| EP | 0 893 332 A1 | 1/1999 |
| EP | 0 893 332 B1 | 1/1999 |
| EP | 1 122 156 A2 | 8/2001 |
| FR | 2 539 693 | 1/1983 |
| FR | 2 749 263 | 12/1997 |
| FR | 2 749 263 A1 | 12/1997 |
| GB | 2 156 412 A | 10/1985 |
| JP | 61 118 211 | 6/1986 |
| JP | 01 164 867 | 6/1989 |

OTHER PUBLICATIONS

Copending U.S. application Ser. No. 09/859,126 filed May 16, 2001.
Copending U.S. application Ser. No. 09/906,289 filed Jul. 16, 2001.
Copending U.S. application Ser. No. 09/923,138 filed Aug. 6, 2001.
Copending U.S. application Ser. No. 09/939,152 filed Aug. 24, 2001.
Copending U.S. application Ser. No. 09/939,245 filed Aug. 24, 2001.
Copending U.S. application Ser. No. 09/974,017 filed Oct. 10, 2001.
Copending U.S. application Ser. No. 09/982,681 filed Oct. 18, 2001.
Copending U.S. application Ser. No. 60/296,312 filed Jun. 6, 2001.
Copending U.S. application Ser. No. 60/317,009 filed Sep. 4, 2001.
International Preliminary Examination Report dated Apr. 19, 2002.
International Search Report dated Oct. 19, 2001.
Written Opinion dated Dec. 31, 2001.

* cited by examiner

HEAT-ACTIVATED STRUCTURAL FOAM REINFORCED HYDROFORM

FIELD OF THE INVENTION

The present invention relates generally to a heat-activated foam reinforced structural member. More particularly, the invention relates to a structural foam reinforced hydroform structures, wherein the structural foam becomes chemically active and expands upon heating.

BACKGROUND OF THE INVENTION

Traditionally, hydroforming techniques are used to draw and shape metal tubes. Conventional hydroforming techniques often involve two steps: (1) placing the desired bends in the tube and (2) forming the tube to the desired configuration. Step 2 usually requires placing a tubular member having an open bore in a mold and pinching off the ends of the tube. A pressurized liquid is injected into the open bore, causing the tube to stretch and expand out against the mold.

The advantage of the hydroforming process is that it allows formation of relatively long tubular structures having a seamless perimeter. This process eliminates the cost of welding or machining operations often used to shape the part in the desired configuration. As a result, a hydroform oftentimes has a high length to diameter ratio. For instance, a hydroform structure may have a length in excess of 15' and a diameter ranging from approximately ¾" to more than 12". It is not unusual for a hydroform structure to exceed the length of other tubular members, such as torsion bars or tubular bars, formed using other processes.

Additionally, hydroforms are complex structural shapes that typically include bends and contour changes. Often the number of bends and contour changes in a hydroformed bar are greater and more complex than those found in torsion bars or other tubular structures formed using different techniques.

Hydroform structures typically have a constant wall thickness prior to forming, and thus tend to develop weak spots at the site of bends or changes in contour, as well as at certain locations along a long tubular section. Thus, hydroform sections are generally reinforced to improve their structural stiffness and strength.

Traditional ways of reinforcing tubular structures such as hydroforms include sliding a metal sleeve inside the tube and welding the reinforcing member in place. However, because the hydroform often includes one or more bends or one or more changes in contour, it is often difficult to insert the sleeve into the hydroform at the site of weak spots. Other techniques include reinforcing the hydroform from the outside by welding the sleeve onto the outside of the hydroform. However, hydroforms are often used in applications having very close tolerances, resulting in little or no clearance for an externally placed reinforcing member.

Additionally, in many operations the weight of the tubular member is critical and must be kept low as possible. Thus, the use of an external sleeve adds unwanted weight to the tubular assembly. Finally, the welding operation tends to be labor intensive, time consuming and inexact, increasing the cost of forming the hydroform member and producing parts that have questionable reliability.

Consequently, there is needed a device and method for reinforcing the weak areas of hydroform tubes without significantly increasing the weight and manufacturing complexity.

SUMMARY OF THE INVENTION

The invention relates to a reinforced hydroform member. In one embodiment, the hydroform member includes an outer structural member having an open bore; and a structural foam supported by the outer structural member. The foam extends along at least a portion of the length of the outer structural member, and may fill at least a portion of the length of the bore.

The structural foam is generally and preferably a heat-activated epoxy-based resin. As the foam is heated, it expands and adheres to adjacent surfaces. The preferred structural foam material is commercially available from L&L Products of Romeo, Michigan under the designation L5206, L5207, L5208, or L5209.

In an alternative embodiment, the hydroform member includes an inner structural member having an open section, wherein the inner structural member is received in the bore of the outer structural member. The outer structural member and the inner structural member are fabricated of metal, and the structural foam extends along at least a portion of the length of the inner structural member and the outer structural member.

In still another embodiment, the reinforced hydroform includes an outer elongated tubular bar having a open center; an elongated inner tubular bar having an open bore coextensive therewith such that the inner tubular bar is received in the open center of the outer tubular bar so as to extend concentrically therewith; and a structural foam supported by the outer surface of the inner tubular bar, wherein the structural foam extends along at least a portion of the length of the inner structural member.

The reinforced hydroform may be formed by (1) providing an outer structural member having an open bore; (2) reinforcing the outer structural member by applying a structural foam thereto; (3) reshaping the outer structural member, causing the exterior surface of the outer structural member to assume a desired configuration; and (4) heating the structural foam to a temperature sufficient to cause the structural foam to expand and adhere to adjacent surfaces.

Where the hydroform includes a inner structural member, the method of forming the reinforced hydroform further includes the step of providing an inner structural member that is received in the open bore of the outer structural member so as to form a structural assembly. The structural assembly is reinforced by applying the structural foam thereto.

BRIEF DESCRIPTION OF THE DRAWINGS

The features and inventive aspects of the present invention will become more apparent upon reading the following detailed description, claims and drawings, of which the following is a brief description:

DESCRIPTION OF THE PREFERRED EMBODIMENT

Figure 1:
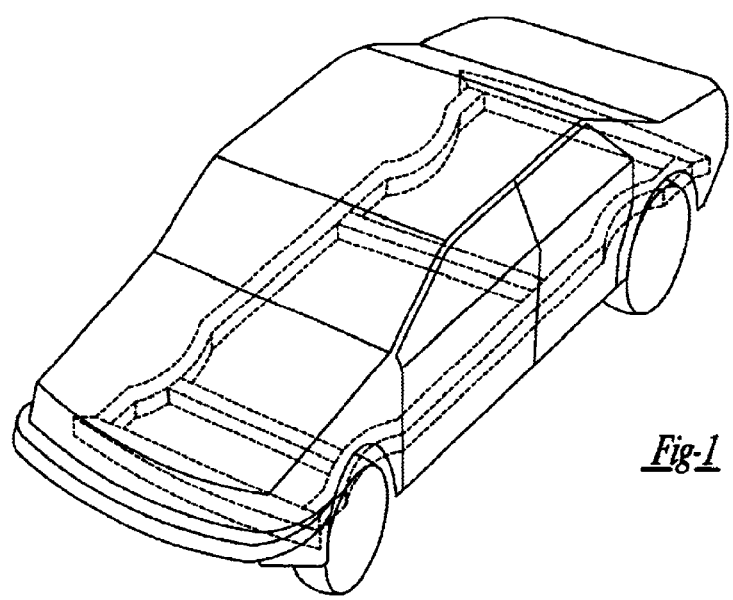
FIG. 1 is a perspective view of an automobile, showing a portion of the automobile frame reinforced by the hydroform member.

FIG. 1 shows a reinforced hydroform member 10 formed in accordance with the teachings of the present invention. The hydroform member 10 imparts increased strength or stiffness to a structural member, and, thus, may be used in a variety of applications. For instance, the reinforced hydroform member 10 may be used as part of the frame system for automobiles or building structures.

Figure 2:
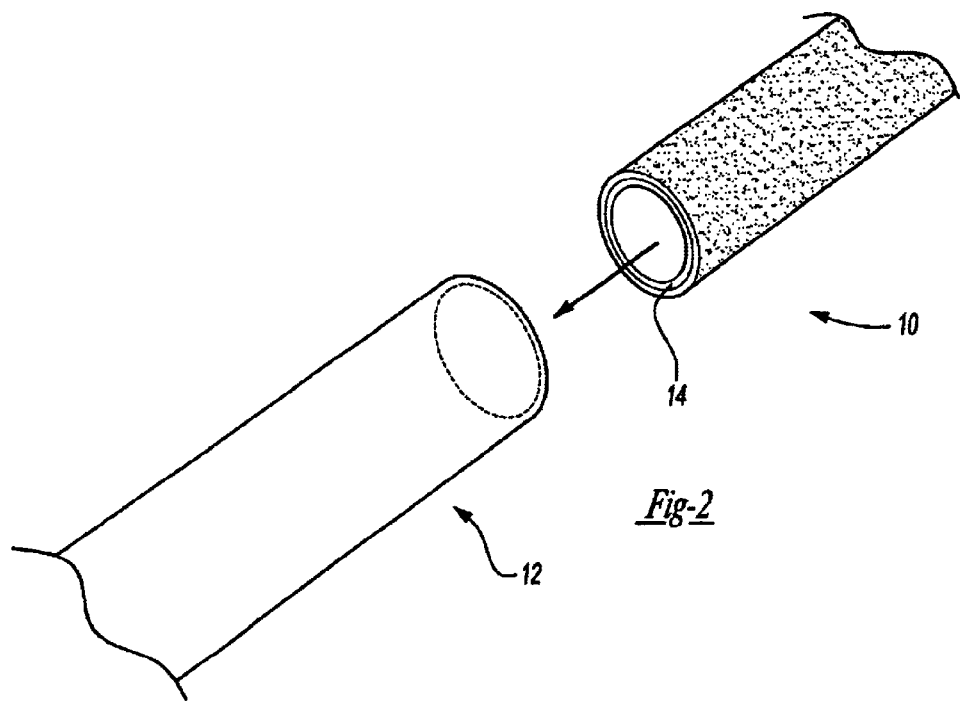
FIG. 2 is a perspective view showing a reinforced hydroform tube formed in accordance with the teachings of the present invention.
Figure 3:
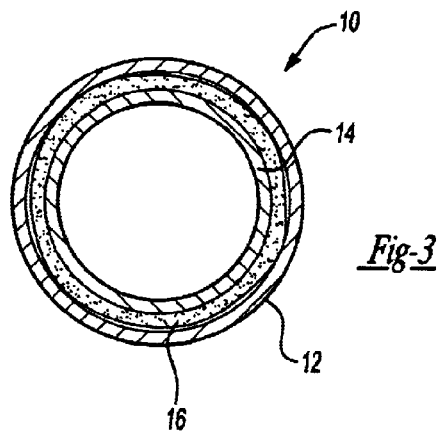
FIG. 3 is a section view of the hydroform tube described in FIG. 2, showing the position of the foam in the uncured state.

The hydroform member 10 includes an outer metal tube 12 and an inner concentric tube 14. The outer tube 12 includes an open center and preferably has a seamless outer perimeter. Although FIG. 2 shows the tube 12 as having a circular cross-section and an open center, other geometric configurations having a continuous perimeter and an open portion therein may be used to form the tube 12. In the preferred embodiment, the outer tube 12 is fabricated of steel. However, it will be appreciated that other materials capable of plastic deformation may be used.

The physical dimensions of the outer tube 12 will vary depending on the intended use of the hydroform member 10. Where the hydroform member 10 is used as part of an automobile framing system, the outer tube 12 may have a length in excess of 15' and an inner diameter typically ranging from approximately ¾" to 12". For an outer tube 12 having these dimensions, the outer tube 12 has a constant wall thickness prior to any deformation. The wall thickness of tube chosen will vary depending on the function and structure of the element being reinforced.

The inner tube 14 is received in the open center of the outer tube 12. Preferably, the inner tube 14 is concentrically received in the open center of the outer tube 12, and extends axially along the length of the outer tube 12 such that each end of the inner tube 14 is substantially flush with the respective ends of the outer tube 12.

In the preferred embodiment, the inner tube 14 has an open center and a seamless outer perimeter. Although FIG. 2 shows the tube 14 as having a circular cross-section and an open center, other geometric configurations having a continuous perimeter and an open portion therein may be used to form the tube 14. The preferred material from which to fabricate the inner tube 14 is steel. However, other materials capable of plastic deformation, particularly aluminum, may be used.

The physical dimensions of the inner tube 14 will vary depending on the intended use of the hydroform member 10. Where the hydroform member 10 is used as part of an automobile framing system, the inner tube 14 may have a length in excess of 15'. The inner diameter typically has a value ranging between approximately 1" and 12" and a constant wall thickness generally having a specific value ranging between 0.030" and 0.30".

As best seen in FIG. 2, the inner tube 14 supports a reinforcing structural foam 16 along at least a portion of the outer perimeter thereof. The primary purpose of the structural foam 16 is to increase the structural strength and stiffness of the components being reinforced. Typically, the structural foam 16 is applied to a carrier in the areas where reinforcement is needed. When dealing with hydroforms, the areas generally needing reinforcement are locations where the surface bends or changes contour. In the preferred embodiment, the structural foam 16 increases the compressive strength, bending strength, and structural stiffness of the hydroform 10 without adding significantly to the overall weight of the hydroform 10.

The structural foam 16 is preferably heat-activated and expands and cures upon heating, typically by a foaming and cross-linking reactions. The structural foam 16 is generally applied to the tube 14 in a solid or semi-solid state. The structural foam 16 may be applied to the outer perimeter of the tube 14 in a fluid state using commonly known injection techniques, wherein the structural foam 16 is heated to a temperature that permits the structural foam 16 to flow slightly. Upon cooling the structural foam 16 hardens and adheres to the outer surface of the tube 14. Alternatively, the structural foam 16 may be applied to the tube 14 as precast pellets, which are heated slightly to permit the pellets to bond to the outer surface of the tube 14. At this stage, the structural foam 16 is heated just enough to cause the structural foam 16 to flow slightly, but not enough to cause the structural foam 16 to thermally expand. Additionally, the structural foam may also be applied by heat bonding/ thermoforming and by co-extrusion. Note that other expandable sheet materials can be used, such as, without limitation, an encapsulated mixture of materials that, when activated by temperature, pressure, chemically, or other by other ambient conditions, will expand.

The structural foam 16 is an epoxy-based material, but may include an ethylene copolymer or terpolymer, such as with an alpha-olefin. As a copolymer or terpolymer, the molecule is composed of two or three different monomers, i.e., small molecules with high chemical reactivity that are capable of linking up with similar molecules.

A number of epoxy-based structural reinforcing foams are known in the art and may also be used to produce the structural foam 16. A typical structural foam includes a polymeric base material, such as an epoxy resin or ethylene-based polymer which, when compounded with appropriate ingredients (typically a blowing agent and perhaps a curing agent and filler), expands and cures in a reliable and predictable manner upon the application of heat or another activation stimulus. The resulting material has a low density and sufficient stiffness to impart desired rigidity to a supported article. From a chemical standpoint for a thermally-activated material, the structural foam 16 is usually initially processed as a thermoplastic material before curing. After curing, the structural foam 16 typically becomes a thermoset material.

An example of a preferred structural foam 16 formulation is an epoxy-based material that may include an ethylene copolymer or terpolymer that is commercially available from L&L Products of Romeo, Michigan, under the designations L5206, L5207, L5208 and L5209. One advantage of the preferred structural foam materials 16 over prior art materials is the preferred materials can be processed in several ways. The preferred materials can be processed by injection molding, extrusion or with a mini-applicator extruder. This enables the creation of part designs that exceed the capability of most prior art materials.

While the preferred materials for fabricating the structural foam 16 have been disclosed, the structural foam 16 can be formed of other materials provided that the material selected is heat-activated or otherwise activated by an ambient condition (e.g. moisture, pressure, time or the like) and expands in a predictable and reliable manner under appropriate conditions for the selected application. One such material is the epoxy based resin disclosed in commonly owned U.S. Pat. No. 6,131,897, the teachings of which are fully incorporated herein by reference. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719;

5,755,486; 5,575,526; 5,932,680 (incorporated herein by reference). In general, the desired characteristics of the structural foam 16 include high stiffness, high strength, high glass transition temperature (typically greater than 70 degrees Celsius), and good corrosion and humidity resistance properties.

In applications where a heat activated, thermally expanding material is employed, an important consideration involved with the selection and formulation of the material comprising the structural foam 16 is the temperature at which a material reaction or expansion, and possibly curing, will take place. For instance, in most applications, it is undesirable for the material to be active at room temperature or otherwise at the ambient temperature in a production line environment. More typically, the structural foam 16 becomes reactive at higher processing temperatures, such as those encountered in an automobile assembly plant, when the foam 16 is processed along with the automobile components at elevated temperatures or at higher applied energy levels. While temperatures encountered in an automobile assembly body shop may be in the range of 148.89° C. to 204.44° C. (300° F. to 400° F.), body and paint shop applications are commonly about 93.33° C. (215° F.) or slightly higher. If needed, blowing agents can be incorporated into the composition to cause expansion at different temperatures outside the above ranges.

Generally, prior art expandable foams have a range of expansion ranging from approximately 0 to over 1000 percent. The level of expansion of the structural foam 16 may be increased to as high as 1500 percent or more, but is typically between 0% and 300%.

The hydroform member 10 may be used in a variety of applications where structural reinforcement is desired. The hydroform member 10 has particular application in those instances where the overall weight of the structure being reinforced is a critical factor. For instance, the hydroform member may be used to increase the structural strength of aircraft frames, marine vehicles, automobile frames, building structures or other similar objects. In the embodiment disclosed the hydroform member 10 is used as part of an automobile frame to reinforce selected areas of the automobile frame.

As best illustrated in FIG. 1, the hydroform member 10 is coupled to the frame portion of an automobile frame assembly. The frame portion to be reinforced by the hydroform member 10 is illustrated by the phantom lines. It will be appreciated that the hydroform 10 may be used to reinforce other areas of an automobile frame.

Method of Forming the Hydroform 10

The method of forming the hydroform member 10 includes applying the structural foam 16 to the outer perimeter of the inner tube 14. The structural foam 16 is applied to the inner tube 14 using the techniques previously discussed.

The inner tube 14 is then received in the open center of the outer tube 12. The tube assembly 12, 14 is reshaped to include any desired bends, twists or contour changes. One particular method in which the tube assembly 12, 14 could be deformed is by first inserting the inner tube 14 into the outer tube 12 to be hydroformed and then bending the outer tube 12 to lock the inner tube 14 into place. After completion of the bending process, the tube assembly 12, 14 is placed in a mold and each end of the tube assembly 12, 14 is sealed using known techniques. For instance, an end cap (not shown) is inserted over each end of the tubular members 12, 14, and one end of a kick bolt (not shown) is coupled to one of the end caps and the other end to a fluid source under pressure.

Next, a hydroforming process is employed to reshape and to stretch the tubular assembly 12, 14 to the desired configuration. It will be appreciated that hydroforming, sometimes referred to as fluid forming or rubber diaphragm forming, is a known process for drawing and shaping metal components. The hydroforming process explained herein is for illustrative purposes only, and it will be appreciated that other hydroforming techniques may be used.

The hydroforming process employed in practicing this invention includes injecting a liquid under pressure into the open center of the tube 14 through the end cap. The fluid pressure causes the tube assembly 12, 14 to expand outwardly, bringing the exterior of the tube 12 into contact with the mold into which the tube assembly 12, 14 has been placed. Consequently, the exterior of the outer tube 12 is forced to assume the shape of the mold. The inner tube 14 can also be drawn during the hydroforming operation at locations wherein the outer tube 12 is also drawn. In other words, the inner tube 14 can be deformed in the same manner as the outer tube 12, whether through the initial bending process or through the subsequent drawing process that occurs during hydroforming. Once the hydroforming process is completed, the kick bolt (not shown) is removed.

Finally, after hydroforming the tube assembly 12, 14, the strength and stiffness of the hydroform 10 is increased by curing the structural foam 16. To cure the structural foam 16, the structural foam 16 is heated to a temperature sufficient to permit the structural foam 16 to expand and adhere to the inner surface of the outer tube 12. As the structural foam 16 is heated, it becomes chemically active and expands, forming a bond with the adjacent structure, the inner surface of the tube 12. The characteristics of the foam 16 can be provided by a separate adhesive layer in between the structural foam 16 and the inner surface of the tube 16, or it can be obtained from the formulation of the foam 16 itself.

Figure 4:
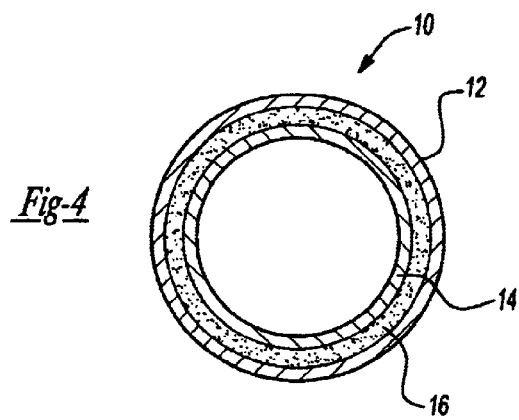
FIG. 4 is a section view of the hydroform tube described in FIG. 2, showing the position of the foam in the cured state.
Figure 5:
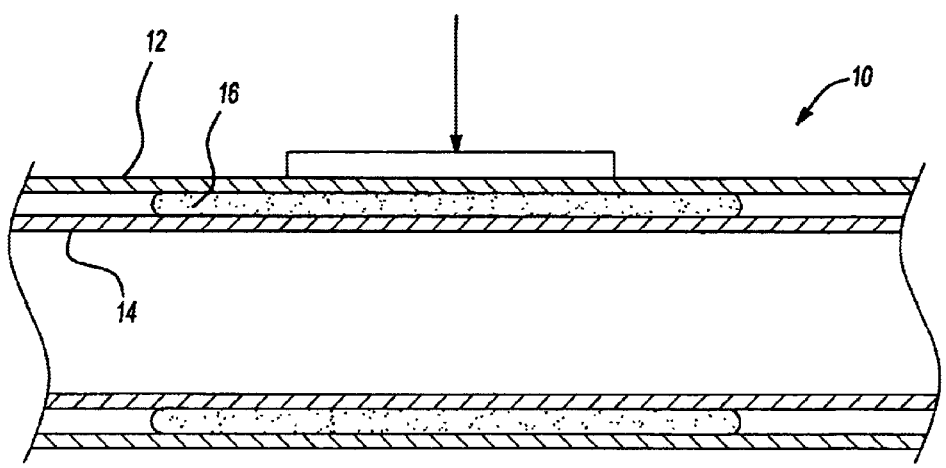
FIG. 5 is a side section view showing the hydroform tube described in FIG. 2.

During the curing cycle, the structural foam 16 is heated to a temperature higher than the temperature used during application of the foam material 16 to the tube 14. This higher temperature causes activation of the expansion and curing properties of the structural foam 16 by initiating chemical decomposition of the blowing agent and curing agent additives. FIG. 4 illustrates the position of the structural foam 16 after the curing cycle. As shown, the structural foam 16 adheres to the inner surface of tube 12 and the outer surface of tube 14. After the curing process, the end caps (not shown) are removed.

Upon cooling, the structural foam 16 stiffens and resists deformation during handling. Preferably, for cost and weight considerations, the structural foam 16 does not extend throughout the entire length of the tube assembly 12, 14. However, it will be appreciated that the structural foam 16 could be applied to the inner tube 14 so as to expand the entire length of the tubular assembly 12, 14.

Alternatively, the structural foam 16 may be applied to the tubular assembly 12, 14 using an extruder or injection process, wherein molten structural foam 16 is dispensed into key sections of the member to be reinforced. In this manner, the molten structural foam material 16 flows into the cavity to be reinforced. Another method for applying the structural foam 16 to the tubular assembly 12, 14 includes using structural foam 16 pellets. The pellets are inserted into the cavity between the tubes 12, 14 and cured as described above.

Preferably, the structural foam 16 is applied to the assembly 12, 14 at the location to be reinforced, which is generally at bends or locations where the surface contour changes. However, it will be appreciated that the structural foam 16 may be applied to the entire length of the hydroform 10 if desired.

The application of the structural from 16 to the tube 14, increases the structural strength and stiffness of the tube 14. As a result, the overall structural strength and stiffness of the hydroform 10 is increased.

There are a variety of configurations that may be employed to fabricate a hydroform member 10. For instance, the hydroform 10 need not be fabricated as a tubular assembly but may comprise any configuration having a continuous perimeter and an open section therein. The disclosed embodiment is given to illustrate the invention. However, it is not intended to limit the scope and spirit of the invention. Therefore, the invention should be limited only by the appended claims.

I claim:

1. A method for forming a reinforced hydroform, comprising:
   providing an outer tubular structure having a surface defining an open bore;
   providing an inner tubular structure having an outer surface;
   positioning an expandable structural material within the open bore of the outer tubular structure between the surface defining the bore and the outer surface of the inner tubular structure;
   hydroforming the outer tubular structure and the inner tubular structure while at least a portion of the expandable material is located in the open bore; and
   activating the expandable structural material to cause the expandable structural material to expand and form a structural foam that adheres to the surface of the outer tubular structure.

2. The method for forming a reinforced hydroform as defined in claim 1 wherein the step of positioning an expandable structural material within the open bore of the outer tubular structure includes disposing the expandable structural material upon the outer surface of the inner tubular structure.

3. The method for forming a reinforced hydroform as defined in claim 2 wherein the expandable material is substantially solid after it is disposed upon the outer surface of the inner tubular structure.

4. The method for forming a reinforced hydroform as defined in claim 1 further including the step of applying an adhesive layer on the expandable material for adhering the structural foam to the surface of the outer tubular structure.

5. The method for forming a reinforced hydroform as defined in claim 1 wherein the step of activating the expandable material includes heating the expandable material to a temperature greater than a glass transition temperature of the expandable material.

6. The method for forming a reinforced hydroform as defined in claim 5 wherein the expandable material has a glass transition temperature greater than 70° Celcius.

7. The method for forming a reinforced hydroform as defined in claim 1 wherein the expandable material is epoxy-based.

8. The method for forming a reinforced hydroform as defined in claim 1 wherein the outer tubular structure is metal.

9. The method for forming a reinforced hydroform as defined in claim 1 further comprising assembling the outer tubular structure to a vehicle as a portion of the frame of the vehicle.

10. The method of forming a reinforced hydroform as defined in claim 1 wherein the expandable material expands from 0% to 300% relative to its original size.

11. The method of forming a reinforced hydroform as defined in claim 10 wherein the expandable material includes an epoxy resin and the expandable material is activated for curing at a temperature in the range of about 148.89° C. to about 204.44° C.

12. The method of forming a reinforced hydroform as defined in claim 11 wherein the outer tubular structure is at least partially formed of aluminum or steel.

13. The method of forming a reinforced hydroform as defined in claim 12 wherein step of activating the expandable material occurs after the step of hydroforming the outer tubular structure and the inner tubular structure.

14. A method for forming a reinforced hydroform for an automotive vehicle, comprising:
   providing an outer elongated metal tube having an open center;
   providing an elongated inner metal tube having an inner surface defining an open bore and an outer surface;
   applying an expandable material to the outer surface of the inner metal tube, the expandable material being substantially solid upon application;
   placing the inner metal tube within the open center of the outer elongated metal tube such that the expandable material is positioned between the inner surface of the inner tube and the outer surface of the outer tube;
   hydroforming the inner tube and the outer tube for forming a first hydroformed contour in the inner tube and a second hydroformed contour in the outer tube while at least a portion of the expandable material is located between the inner tube and the outer tube; and
   activating the expandable material to expand between the inner tube and the outer tube thereby forming a structural foam that adheres to at least one of the first hydroformed contour and the second hydroformed contour.

15. The method for forming a reinforced hydroform as defined in claim 14, further including the step of applying an adhesive layer on the expandable material for adhering the structural foam to the surface of the outer structural member.

16. The method for forming a reinforced hydroform as defined in claim 14 wherein the step of activating the expandable material includes heating the expandable material to a temperature greater than a glass transition temperature of the expandable material and wherein the glass transition temperature is greater than 70° C.

17. The method for forming a reinforced hydroform as defined in claim 14 wherein the expandable material has a glass transition temperature greater than 70° Celcius.

18. The method for forming a reinforced hydroform as defined in claim 14 wherein the expandable material is epoxy-based.

19. The method for forming a reinforced hydroform as defined in claim 14 further comprising assembling the inner tube and the outer tube to a vehicle as a portion of a frame of the vehicle.

20. The method for forming a reinforced hydroform as defined in claim 14 wherein the expandable material is in a substantially solid state at room temperature.

21. A method for forming a reinforced hydroform for an automotive vehicle, comprising:
   providing an outer elongated metal tube having an open center;
   providing an elongated inner metal tube having an inner surface defining an open bore and an outer surface;

applying an expandable material to the outer surface of the inner metal tube, the expandable material being epoxy-based and substantially solid upon application;

placing the inner metal tube within the open center of the outer elongated metal tube such that the expandable material is positioned between the inner surface of the inner tube and the outer surface of the outer tube and such that the inner tube is substantially concentric with the outer tube;

hydroforming the inner tube and the outer tube simultaneously for forming a first hydroformed contour in the inner tube and a second hydroformed contour in the outer tube wherein;
  i) the first hydroformed contour is adjacent to and corresponding with the second hydroform contour and at least a portion of the expandable material is located between the first hydroformed contour and the second hydroformed; and heating the expandable material to expand the expandable material between the first hydroformed contour and the second hydroformed contour thereby forming a structural foam that adheres to the inner surface of the outer tube and to the outer surface of the inner tube wherein the structural foam extends along at least a portion of the length of the inner tube and further wherein the inner tube, the outer tube and the foam cooperatively form at least a portion of a frame of an automotive vehicle.

22. The method for forming a reinforced hydroform as defined in claim 21 further including the step of applying an adhesive layer on the expandable material for adhering the structural foam to the surface of the outer structural member.

23. A method for forming a reinforced hydroform automotive vehicle frame structure, comprising:

providing an outer tubular structure having an inner surface defining an open bore;

providing an inner tubular structure having an outer surface;

introducing a thermally activated polymeric material within a space defined between the inner surface of the outer tubular structure and the outer surface of the inner tubular structure;

bonding the thermally activated polymeric material to at least one of the tubular structures;

hydroforming the outer tubular structure and the inner tubular structure with the thermally activated polymeric material therebetween to form the automotive vehicle frame structure.

24. A method for forming a reinforced hydroform as defined in claim 23 wherein the step of bonding the thermally activated polymeric material includes heating the polymeric material.

25. A method for forming a reinforced hydroform as defined in claim 24 wherein the step of introducing a thermally activated polymeric material includes injecting the polymeric material.

26. A method for forming a reinforced hydroform as defined in claim 25 wherein the polymeric material includes an epoxy resin.

27. A method for forming a reinforced hydroform as defined in claim 26 wherein the outer tubular structure is formed of aluminum or steel.

28. The method of forming a reinforced hydroform as defined in claim 27 wherein the polymeric material is activated for curing at a temperature in the range of about 148.89° C. to about 204.44° C.

29. A method for forming a reinforced hydroform as defined in claim 28 wherein the bonding is performed prior to the step of hydroforming.

30. A method for forming a reinforced hydroform as defined in claim 29 wherein hydroforming the inner tubular structure and the outer tubular structure forms a first hydroformed contour in the inner tubular structure and a second hydroformed contour in the outer tubular structure and the polymeric material adheres to at least one of the first hydroformed contour and the second hydroformed contour.

31. A method for forming a reinforced hydroform as defined in claim 28 wherein the bonding is performed after the step of hydroforming.

* * * * *